US008437773B2

(12) United States Patent
Sridhara et al.

(10) Patent No.: US 8,437,773 B2
(45) Date of Patent: May 7, 2013

(54) HIERARCHICAL INFORMATION DISSEMINATION FOR LOCATION BASED SYSTEMS

(75) Inventors: Vinay Sridhara, Santa Clara, CA (US); Behrooz Khorashadi, San Jose, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 12/851,426

(22) Filed: Aug. 5, 2010

(65) Prior Publication Data
US 2011/0136503 A1    Jun. 9, 2011

Related U.S. Application Data

(60) Provisional application No. 61/267,995, filed on Dec. 9, 2009.

(51) Int. Cl.
  *H04W 64/00*    (2009.01)
(52) U.S. Cl.
  USPC ........................................ 455/456.1; 370/338
(58) Field of Classification Search ............... 455/456.1; 370/338
  See application file for complete search history.

(56) References Cited

U.S. PATENT DOCUMENTS

| | | | |
|---|---|---|---|
| 6,088,598 A | 7/2000 | Marsolais | |
| 6,847,823 B2 | 1/2005 | Lehikoinen et al. | |
| 7,271,702 B2 | 9/2007 | Patil et al. | |
| 7,551,930 B2 | 6/2009 | Lempio et al. | |
| 8,280,058 B2 * | 10/2012 | Conway et al. | 380/270 |
| 2002/0077060 A1 | 6/2002 | Lehikoinen et al. | |
| 2003/0040272 A1 | 2/2003 | Lelievre et al. | |
| 2003/0040313 A1 * | 2/2003 | Hogan et al. | 455/435 |
| 2003/0065805 A1 | 4/2003 | Barnes, Jr. | |
| 2003/0120826 A1 | 6/2003 | Shay | |
| 2003/0220835 A1 | 11/2003 | Barnes, Jr. | |
| 2004/0224702 A1 | 11/2004 | Chaskar | |
| 2005/0136949 A1 | 6/2005 | Barnes, Jr. | |
| 2005/0181808 A1 | 8/2005 | Vaudreuil | |
| 2006/0088028 A1 | 4/2006 | Leiber et al. | |
| 2006/0133328 A1 * | 6/2006 | Levendel et al. | 370/338 |
| 2006/0142027 A1 | 6/2006 | Krishnamurthi et al. | |
| 2007/0124395 A1 | 5/2007 | Edge et al. | |
| 2007/0126573 A1 * | 6/2007 | Valania | 340/539.13 |
| 2007/0149212 A1 | 6/2007 | Gupta et al. | |

(Continued)

FOREIGN PATENT DOCUMENTS

| | | |
|---|---|---|
| CN | 101222283 A | 7/2008 |
| EP | 1189462 A1 | 3/2002 |

(Continued)

OTHER PUBLICATIONS

Andersson, et al., "Design and Evaluation of Anonymity Solutions for Mobile Networks," Doctoral thesis at Fakulteten för ekonomi, kommunikation och IT, 2007.

(Continued)

*Primary Examiner* — Marcos Batista
(74) *Attorney, Agent, or Firm* — Arnold J. Gum

(57) ABSTRACT

Techniques are provided which may be implemented in various methods and/or apparatuses that support information dissemination for and/or within location based systems to control information dissemination.

44 Claims, 7 Drawing Sheets

U.S. PATENT DOCUMENTS

| | | | |
|---|---|---|---|
| 2007/0230385 A1 | 10/2007 | Gaw | |
| 2008/0192777 A1* | 8/2008 | Choi et al. | 370/539 |
| 2009/0003281 A1 | 1/2009 | Panabaker | |
| 2009/0190524 A1* | 7/2009 | Liu et al. | 370/328 |

FOREIGN PATENT DOCUMENTS

| | | | |
|---|---|---|---|
| EP | 1192815 A1 | 4/2002 | |
| EP | 1217857 A2 | 6/2002 | |
| EP | 1517564 A1 | 3/2005 | |
| KR | 100870798 B1 | 11/2008 | |
| WO | WO2004019632 A1 | 3/2004 | |
| WO | WO2006130845 A2 | 12/2006 | |
| WO | WO2006134164 A1 | 12/2006 | |
| WO | WO2008091545 A2 | 7/2008 | |
| WO | WO2009072733 A1 | 6/2009 | |

OTHER PUBLICATIONS

Ardagna, et al., "Privacy-enhanced Location-based Access Control," Handbook of Database Security, 2008, pp. 531-552.

Barbeau, et al., "Principles of ad hoc networking," Wiley; May 2007.

Becker et al., "Usenet-on-the-fly: supporting locality of information in spontaneous networking environments," Workshop on Ad Hoc Communications and Collaboration in Ubiquitous Computing Environments, 2002.

Boukerche, A., "Handbook of algorithms for wireless networking and mobile computing," Chapman and Hall/CRC; 2006, Chap. 8, pp. 165-181.

Butz, A., "Between location awareness and aware locations: where to put the intelligence," Applied Artificial Intelligence, 2004.

Cai et al., "Design, analysis, and implementation of a large-scale real-time location-based information sharing system," Proceedings of the 6th international conference on Mobile systems, applications, and services, 2008, pp. 106-117.

Cianca et al., "Integration of Navigation and Communication for Location and Context Aware RRM," Springer, 2007, pp. 25-40.

Cugola, et al., "Content-based Publish-Subscribe in a Mobile Environment," Mobile Middleware, 2006.

Darlagiannis, et al., "Peer-to-peer applications beyond file sharing: overlay network requirements and solutions," Elektrotechnik and Informationstechnik, Jun. 2006, pp. 242-250, vol. 123, No. 6.

Fu et al., "Broadcast schedules and query processing for k nearest neighbors search on multi-dimensional index trees in a multi-channel environment," IEEE Conference on Systems, Man, and Cybernetics, Oct. 2006, pp. 2646-2651.

Hirano et al., "A proposal for gps-less location detection using a reference direction information sharing method with co-operation of mobile terminals," Proceedings of the first ACM international workshop on Mobile entity localization and tracking in GPS-less environments, 2008, pp. 19-24.

Ho, et al., "A Simple kNN Search Protocol using Data Broadcasting in Wireless Mobile Environments," In Proceedings of the 25nd Workshop on Combinatorial Mathematics and Computation Theory, 2008, pp. 303-310.

Imielinski J., et al., "RFC 2009: GPS-Based Addressing and Routing", GPS-Based Addressing and Routing, XX, XX, Nov. 30, 1996, pp. 1-27, XP002131778.

International Search Report and Written Opinion—PCT/US2010/059568, International Search Authority—European Patent Office—Mar. 28, 2011.

Kim, et al., "The semantic web approach in location based services," Computational Science and Its Applications—ICCSA, 2005 pp. 127-136.

Konstantinidis, A., "Adding Location to a High Performance publish/subscribe Message Dispatcher," Project Report for MSc Degree in Computing Science at Imperial College London, Sep. 2008.

Krishnamurthy et al., "Information Dissemination and Information Assurance in Vehicular Networks: A Survey," iConference Papers, 2008.

Langheinrich, M., "Secure localised storage based on super-distributed RFID-tag infrastructures," 2007 International Conference on Mobile Data Management, May 2007, pp. 233-237.

Lee, E.A., "The problem with threads," Computer, May 2006, pp. 33-42.

Lee et al., "DSI: a fully distributed spatial index for location-based wireless broadcast services," 25th IEEE International Conference on Distributed Computing Systems, Jun. 2005, pp. 349-358.

Lee, et al., "Valid scope computation for location-dependent spatial query in mobile broadcast environments," Proceedings of the 17th ACM conference on Information and knowledge management, 2008, pp. 1231-1240.

Lee et al., "When location-based services meet databases," Journal Mobile Information Systems, Apr. 2005, pp. 81-90, vol. 1 Iss. 2.

Lin et al., "Schedules with minimized access latency for disseminating dependent information on multiple channels," Proceedings. IEEE International Conference on Sensor Networks, Ubiquitous and Trustworthy Computing, Jun. 2006, pp. 8.

Lin, K.J., "Building Web 2.0," Computer, May 2007, pp. 101-102, vol. 40, No. 5.

Liu, H., "A Model for Publish/Subscribe System Supporting Uncertainties," Thesis for Master of Science Degree at University of Toronto, 2003.

Mateo et al., "Location-aware Agent using Data Mining for the Distributed Location-Based Services," International Conference on Computational Science and Its Applications, 2006.

Mavromoustakis, et al., "Dispersed information diffusion with level and schema-based coordination in mobile peer to peer networks," Springer Netherlands, 2007, pp. 33-45.

Michel, et al., "Location-aware caching in mobile environments," Master's thesis, Freie Universitat Berlin, Jun. 2006.

Nittel, et al., "Information Dissemination in Mobile Ad-hoc Geosensor Networks," In: Egenhofer, M.; Freksa, C.; Miller, H.J. (Eds.), Geographic Information Science. Lecture Notes in Computer Science, 3234. 2004, pp. 206-222.

O'Grady, M.J., "Just in time multimedia distribution in a mobile computing environment," IEEE Multimedia, Oct.-Dec. 2004, pp. 62-74, vol. II, No. 4.

Oh et al., "A Scheme for Location-Based Internet Broadcasting and Its Applications," IEEE Communications Magazine, Nov. 2007, pp. 136-141.

Papadopouli, et al., "Performance of data dissemination among mobile devices," 2001.

Papadopouli, et al., "Resource sharing in mobile wireless networks," Ph.D. Dissertation, Computer Science Department Columbia University, Oct. 2002.

Podar, I., et al., "Service Architecture for Content Dissemination to Mobile Users," Doctoral dissertation submitted to the Faculty of Electrical Engineering and Computing at the University of Zagreb, Feb. 2004.

Schall et al., "Context-aware Mobile Computing," In Encyclopedia of Wireless and Mobile Communications, Edited by Borko Furht, CRC Press, 2007.

Schilit, William Noah, "A system architecture for context-aware mobile computing," Doctoral Dissertation Columbia University, 1995.

Smith, et al., "Spatial Data Infrastructure Requirements for Mobile Location Based Journey Planning," Transactions in GIS, Jan. 2004, pp. 23-44, vol. 8, Iss. 1.

Tsalgatidou et al.,"Challenges in Mobile Electronic Commerce," Proceedings of IeC 2000. 3rd Int. Conf. on Innovation through E-Commerce, Nov. 2000.

Vijayalakshmi et al., "Enhanced D-tree: an index structure for window queries in location based services," IEEE International Networking and Communications Conference, May 2008, pp. 124-131.

Xu et al., "The D-tree: an index structure for planar point queries in location-based wireless services," IEEE Transactions on Knowledge and Data Engineering, Dec. 2004, pp. 1526-1542.

Zeidler, A., "A Distributed Publish Subscribe Notification Service for Pervasive Environments," Dissertation, Darmstadt University of Technology, 2004.

Ziering, et al., "TransXML: XML Schemas for Exchange of Transportation," NCHRP Report 576, Research Sponsored by the American Association of State Highway and Transportation Officials, 2007.

* cited by examiner

HIERARCHICAL INFORMATION DISSEMINATION FOR LOCATION BASED SYSTEMS

RELATED APPLICATION

This patent application claims benefit of and priority to U.S. Provisional Patent Application No. 61/267,995, filed Dec. 9, 2009, titled "Hierarchical Information Dissemination", and incorporated in its entirety by reference herein.

BACKGROUND

1. Field

The subject matter disclosed herein relates to electronic devices, and more particularly to methods and apparatuses for use in a networked computing and/or communication environment providing location based services.

2. Information

A location based system may include one or more computing devices that are capable of providing and/or otherwise supporting various location based services.

Location based services may, for example, include various information services that may be accessed using a mobile device coupled to a wireless communication device or network. A location based service may, for example, respond to a request for information from a mobile device by providing information that relates in some manner to the request but which may also be based, at least in part, on the position of the mobile device. Thus, for example, a location based service may take into account an estimated position of the mobile device and other information relating to the context of a user and/or mobile device to complete a search for applicable information that may be relevant to the user and/or other processes within the mobile device.

A location based system may include one or more computing devices, communication devices, and/or the like, to operatively couple to a mobile device, and other networked resources, such as, e.g., various positioning services, devices, and/or related information, one or more wireless and/or wired communication services and/or networks, one or more service and/or content providers services, devices, and/or related information, and/or the like.

A location based service may be enabled to provide and/or otherwise support data processing and/or communications for one or more services such as, e.g., location services, search services, navigation services, identification services, and/or the like.

The amount of information to be gathered and/or disseminated in a location based system may be significant and keeping such information current, for example, in a central database or other like repository may prove time consuming and/or significantly costly.

SUMMARY

In accordance with certain aspects, techniques are provided which may be implemented in various methods and/or apparatuses that support information dissemination for and/or within location based systems to control and/or otherwise support information dissemination.

By way of example, a method may be provided for use in a location based system having a hierarchical zonal structure. Here for example, a hierarchical zonal structure may be defined, at least in part, by a plurality of nodal transmitting devices. The method may include, with at least one nodal transmitting device, obtaining information associated with an item of interest which may be located at a specified location. The information being selectively propagated within the location based system to the nodal transmitting device based, at least in part, on a spatial restriction parameter associated with the specified location, and/or a temporal restriction parameter associated with the hierarchical zonal structure.

In certain further examples, a method may also include, receiving a request from a mobile device for at least a portion of the information relating to the item of interest, identifying at least an estimated position of the mobile device, and selectively providing a response to the mobile device based, at least in part, on the estimated position of the mobile device. Here, for example, a response may comprise at least a portion of the information. In certain other examples, a method may provide (e.g., forward, broadcast, etc.) a received request to one or more other nodal transmitting devices and/or one or more other computing devices.

In certain examples, a hierarchical zonal structure may comprise a logically formed hierarchical zonal structure defined, at least in part, by at least a portion of the plurality of nodal transmitting devices. In certain examples, a hierarchical zonal structure may comprise an ad-hoc formed hierarchical zonal structure defined, at least in part, by at least a portion of the plurality of nodal transmitting devices.

In certain examples, a method may include identifying a corresponding zonal position of the mobile device associated with the hierarchical zonal structure.

In certain examples, a spatial restriction parameter may be associated with a hierarchical zonal structure. For example, a spatial restriction parameter may comprise a distance value to operatively restrict propagation of the information to one or more particular zonal positions of the hierarchical zonal structure.

Thus, for example, in certain further examples, a spatial restriction parameter may comprise a time-to-live (TTL) value and/or the like. Here, for example, a method may further include determining whether a TTL value permits further propagation of the information within the location based system. In response to determining that a TTL value does permit further propagation of the information, the method may include transmit at least a portion of the information to at least one other nodal transmitting device. Here, for example, the nodal transmitting device may be associated with a first zonal position of the hierarchical zonal structure, and the other nodal transmitting device may be associated with a second zonal position of the hierarchical zonal structure.

In certain examples, a temporal restriction parameter may be associated with a refresh rate value. Thus, for example, in certain instances a first zonal position encompassing the specified location may be associated with a first refresh rate value, and a second zonal position (e.g., not encompassing the specified location) may be associated with a second refresh rate value that may be different from the first refresh rate value.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects of the present description, techniques are provided which may be implemented in various methods and/or apparatuses that support information dissemination for and/or within location based systems. As mentioned, the amount of information to be gathered and/or disseminated in a location based system may be significant and keeping such information current, for example, in a central database or other like repository may prove time consuming and/or significantly costly (e.g., in terms of the upload bandwidth needed to keep updating this information and for the portable devices requesting the information to have to download it from potentially congested global networks such as cellular networks). As illustrated by certain example implementations herein, techniques are provided which may be implemented to control information dissemination in location based systems in a manner relating to one or more hierarchical zonal structures and which tends to reduce overhead and/or system loading while still supporting efficient information search and other location based services. In certain example implementations, information dissemination may be kept essentially local, which, for example, may provide privacy and security advantages as information may be made to be selectively available, e.g., within a physical locality, etc.

Figure 1:
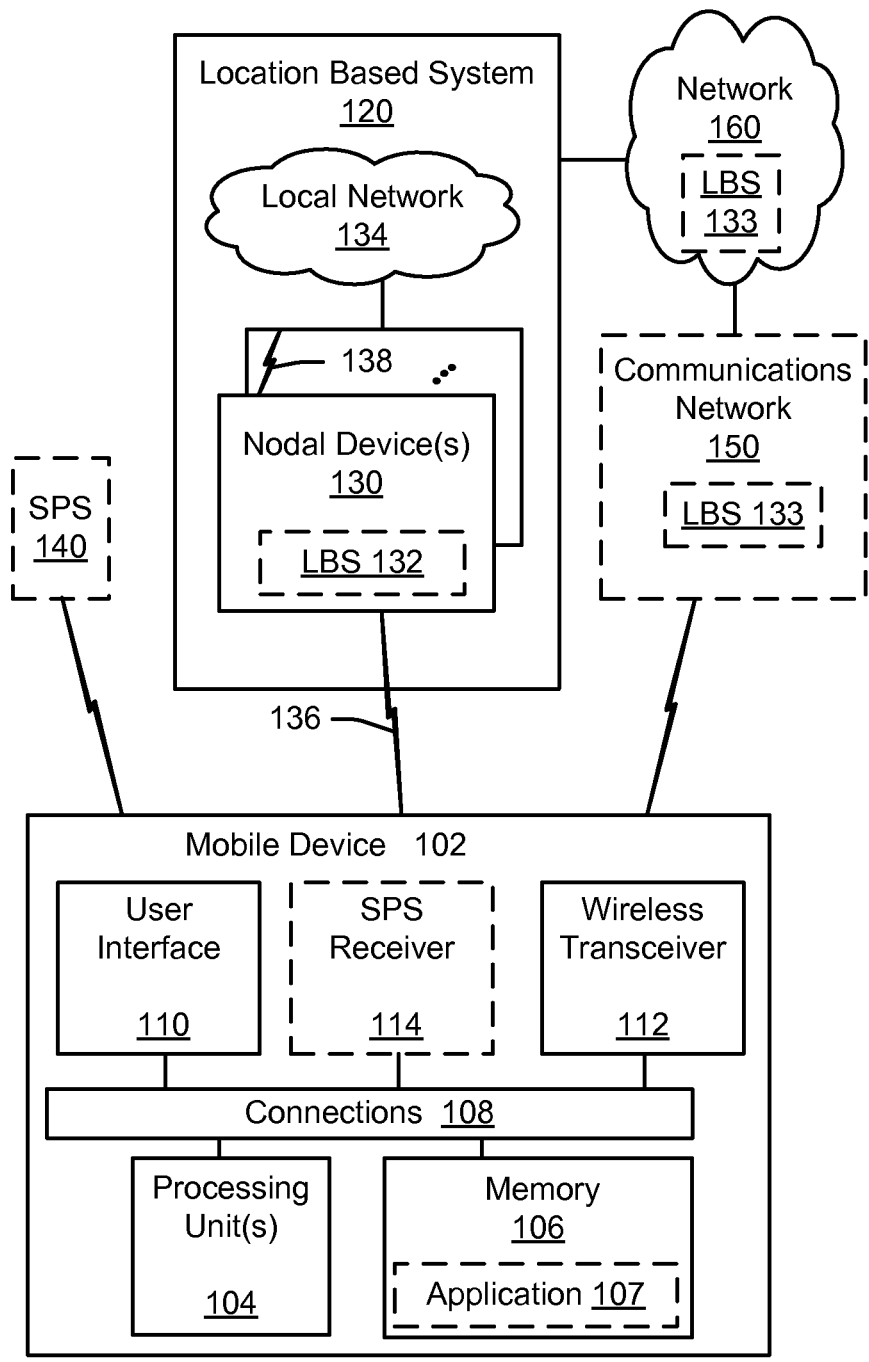
FIG. 1 is a schematic block diagram illustrating an exemplary networked computing environment that includes a location based system, in accordance with an implementation.

FIG. 1 is a schematic block diagram depicting a networked computing environment 100 that includes a location based system 120, in accordance with certain example implementations.

Networked computing environment 100 may, for example, include a mobile device 102 which may communicate with one or more nodal transmitting devices 130 of location based system 120 to request and receive information there from as part of a location based service (LBS) 132 having some coverage area. In this example, mobile device 102 may be representative of any device that may be capable of requesting and receiving information associated with at least one LBS.

Mobile device 102 may, for example, include a processing unit 104, memory 106, various connections 108, a user interface 110, a wireless transceiver 112, and a Satellite Positioning System (SPS) receiver 114.

By way of example, a user of mobile device 102 may initiate access to a LBS by indicating an item of interest through user interface 110. Here, for example, instructions of an application 107 may be executed by processing unit 104 to access an LBS, e.g., via connections 108 and wireless transceiver 112 as illustrated by wireless signal 136. For example, one or more signals representing a request for information relating to an item of interest may be transmitted by wireless signal 136 to a nodal transmitting device 130.

A request may, for example, identify in some manner at least the item of interest. In certain example implementations, a request may also include information relating to the location of the mobile device. For example, information relating to the location of the mobile device may specify an estimated position of the mobile device. Here, for example, an estimated position of the mobile device may be determined in whole or part by SPS receiver 114 based on signals received from SPS 140 using known positioning techniques. In certain other example implementations, an estimated position of the mobile device may be determined in whole or part based on signals received from location based system 120 and/or communications network 150 using other known positioning techniques. In still other implementations, an estimated position of mobile device 102 may be determined or otherwise obtained, in whole or part, by one or more computing and/or communication devices provided in location based system 120, communications network 150, and/or otherwise available via local network 134 and/or network 160.

In processing a request for information associated with an item of interest, location based system 120 may transmit a response via one or more signals represented in FIG. 1 also by wireless signal 136. For example, a nodal transmitting device 130 may consider an estimated position of the mobile device in processing a request from information. Here, for example as described in greater detail in subsequent sections of this description, the information that may be available to or from a given nodal transmitting device may be affected in some manner based on a relative position (e.g., relative nodal position) of the mobile device and/or nodal transmitting device within a hierarchical structure associated with location based system 120. Thus, for example, a level of detail (e.g., amount, precision, timeliness, etc.) of the information in a response may vary depending on the nodal position of the mobile device and/or nodal transmitting device from a nodal position of the item of interest and/or other nodal transmitting device that initially generates and/or otherwise obtains information relating to the item of interest.

As further illustrated in FIG. 1, a plurality of nodal transmitting devices may be operatively coupled together via wireless signals 138 and/or local network 134. As such, a hierarchical structure may be physically (e.g., ad hoc, etc.) and/or otherwise logically formed by location based system 120.

In certain example implementations, location based system 120 may be associated with a specific region. For example, location based system 120 may be associated with a particular campus, compound, building(s), and/or the like. In certain instances, location based system 120 may be implemented as a stand-alone system. Thus, for example, if available to a mobile device (e.g., as the mobile device approaches or enters the specific region), location based system 120 may be accessed to provide location based service(s).

In certain other instances, location based system 120 may be operatively implemented to further support and/or augment one or more other LBS(s) 133, e.g., illustrated here as being provided in whole or part by communications network 150 and/or network 160. Thus, for example, a mobile device may initially access other such location based service(s) and then (e.g., as the mobile device approaches or enters a specific region) location based system 120 may be accessed to provide further localized location based service(s). In certain example implementations, all or part of the information within location based system 120 may be locally generated and/or otherwise selectively confined (e.g., through selective propagation) to devices and/or services therein. In certain other example implementations, all or part of the information within location based system 120 may be imported/exported in some manner from/to other remote devices and/or services, e.g., within network 160 and/or communications network 150.

SPS 140 may, for example, comprise a Global Navigation Satellite System (GNSS), such as, the Global Positioning System (GPS), GLONASS, Galileo, etc., and/or other like positioning systems.

Communications network 150 may, for example, comprise one or more telecommunications and/or other like data communication networks capable of being accessed by mobile device 102. Communication network 150 and/or network 160, and/or certain nodal transmitting device may, for example, comprise transmitting devices and/or other like computing devices which may act as repeaters to provide, extend, and/or otherwise enhance a coverage area for communications with mobile devices. For example, certain repeaters may provide for "femto-cell", "pico-cell", etc., operative regions of coverage.

Network 160 may, for example, comprise the Internet, an intranet, a cloud computing service, and/or other like network (s)/resources capable of being accessed by mobile device 102, location based system 120, and/or communications network 150.

Figure 2:
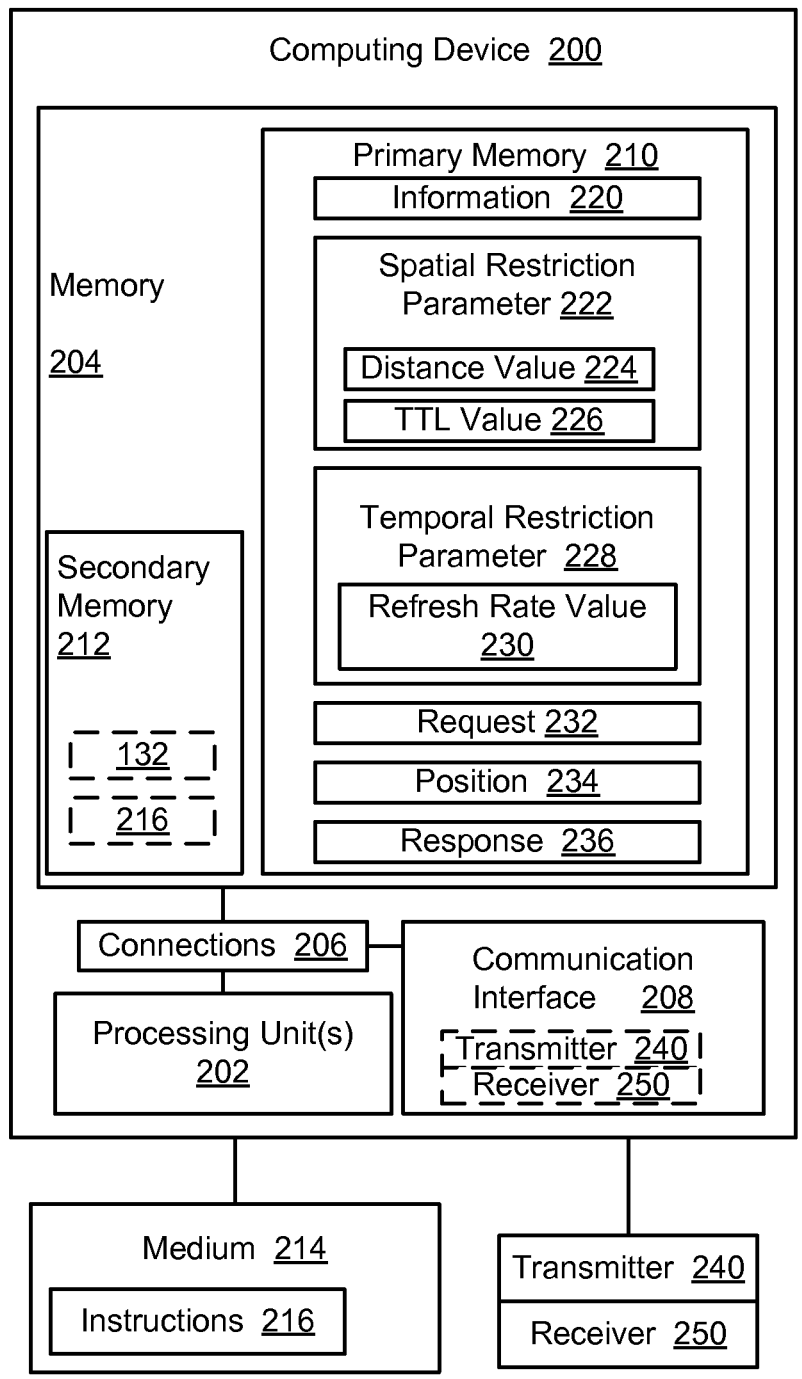
FIG. 2 is a schematic block diagram illustrating certain features of an exemplary nodal transmitting device, for example, as may be implemented in a location based system as in FIG. 1, in accordance with an implementation.

FIG. 2 is a schematic block diagram depicting certain features of an example nodal transmitting device 130, in accordance with certain example implementations.

Nodal transmitting device 130 may, for example, comprise a computing device 200 that may include and/or otherwise be coupled to a transmitter 240 and receiver 250 (or a transceiver) for communicating with other nodal transmitting devices, mobile devices, and/or the like.

Computing device 200 may be operatively receptive of a computer readable medium 214 and access computer-implementable instructions 216 that may be stored therein. For example, computer-implementable instructions 216 may provide all or part of the instructions to processing unit 202 and/or other devices within nodal transmitting device 130 to provide or support LBS 132.

Computing device 200 may, for example, comprise one or more processing unit(s) 202, memory 204, various connections 206, and communication interface 208.

Memory 204 may, for example, comprise a primary memory 210 and a secondary memory 212. By way of example only, primary memory 210 may comprise solid state memory circuitry such as a random access memory, etc., and secondary memory 212 may also comprise solid state memory circuitry and/or other type of computer-readable medium such as a hard disk drive, optical disc, etc.

Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

As illustrated in FIG. 2, memory 204 may, at certain times store data therein which represents information 220 (e.g., associated with at least one item of interest), a spatial restriction parameter 222, a distance value 224, a time-to-live (TTL) value 226, a temporal restriction parameter 228, a refresh rate value 230, a request 232 (e.g., from a mobile device), an estimated position 234 (e.g., of a mobile device), a response 236 (e.g., for a mobile device), and/or other like data and/or instructions 216 associated with LBS 132.

Communication interface 208 may, for example, include a transmitter 240 and receiver 250, or otherwise provide access to a transmitter 240 and a receiver 250.

Communication interface 208 (and/or wireless transceiver 112 of FIG. 1) may, for example, be enabled for use with various wireless communication networks such as a wireless wide area network (WWAN), a wireless local area network (WLAN), a wireless personal area network (WPAN), and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x network, for example.

Figure 3:
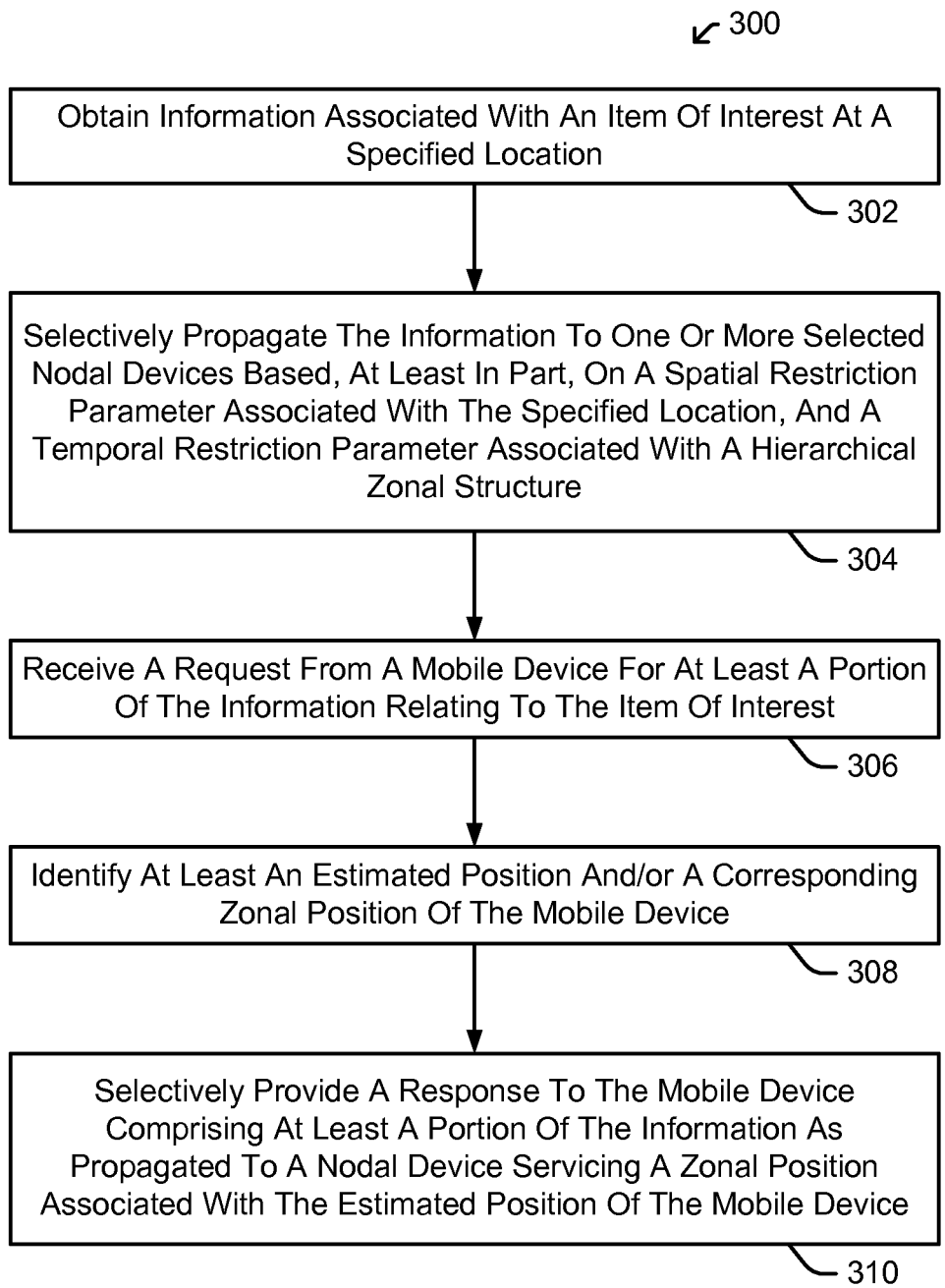
FIG. 3 is a functional flow diagram illustrating certain features of an exemplary process that may be implemented in a location based system as in FIG. 1, in accordance with an implementation.

FIG. 3 is a flow-diagram depicting a process 300 that may be implemented in whole or part in location based system 120, in accordance with certain example implementations.

As shown, at block 302, information associated with an item of interest at a specified location may be obtained. For example, location and/or other context information for an item of interest within a zone may be generated and/or otherwise obtained by one or more nodal transmitting devices operatively associated with the zone. At block 304, all or part of the information may be selectively propagated (e.g., transmitted or otherwise provided) to one or more selected nodal transmitting devices based, at least in part, on a spatial restriction parameter associated with the specified location, and/or a temporal restriction parameter associated with a hierarchical zonal structure of location based system 120.

At block 306, a request from a mobile device may be received or otherwise obtained and which may pertain to at least a portion of the information relating to the item of interest. At block 308, at least an estimated position and/or a corresponding zonal position of the mobile device may be identified or otherwise obtained. At block 310, a response may be selectively provided (e.g., transmitted) to the mobile device. Here, for example, a response may comprise at least a portion of the information as propagated (e.g., broadcast) to a nodal transmitting device servicing a zonal position associated with the estimated position of the mobile device.

A spatial restriction parameter may, for example, be associated with the hierarchical zonal structure in some manner. For example, a spatial restriction parameter may specify or otherwise relate to a distance value that may be used at block 310 to operatively restrict dissemination (e.g., via propagation) of information to one or more particular zonal positions of said hierarchical zonal structure.

In certain example implementations, a spatial restriction parameter may specify or otherwise relate to a time-to-live (TTL) value. Thus, for example at block 304, a second nodal transmitting device may obtain information from a first nodal transmitting device, determine whether a TTL value permits further dissemination (e.g., via propagation) of the information within location based system 120, and if so transmit or otherwise provide the information to at least a third nodal transmitting device. Here, for example, the second nodal transmitting device may be operatively associated with a second zonal position of a hierarchical zonal structure, and the third nodal transmitting device may be operatively associated with a third zonal position of the hierarchical zonal structure.

In certain example implementations, a temporal restriction parameter may specify or otherwise relate to a refresh rate value. Thus, for example at block 304, a first zonal position encompassing a specified location of a mobile device may be associated with a first refresh rate value, while a second or other zonal position(s) not encompassing the specified location may be associated with a second or other refresh rate value(s) which may be different from the first refresh rate value and/or each other.

Reference is made next to FIGS. 4 through 7, which illustratively depict certain aspects of some hierarchical zonal structures that may be associated with, or otherwise formed by, location based system 120 (FIG. 1) and/or process 300 (FIG. 3), for example. As illustrated herein, a hierarchical zonal structure may include any location based system that may be operatively (e.g., logically) and/or physically arranged to provide two or more zones having operatively and/or physically some hierarchical relationship there between such that information to be broadcast within such zones may be different in some manner.

Figure 4:
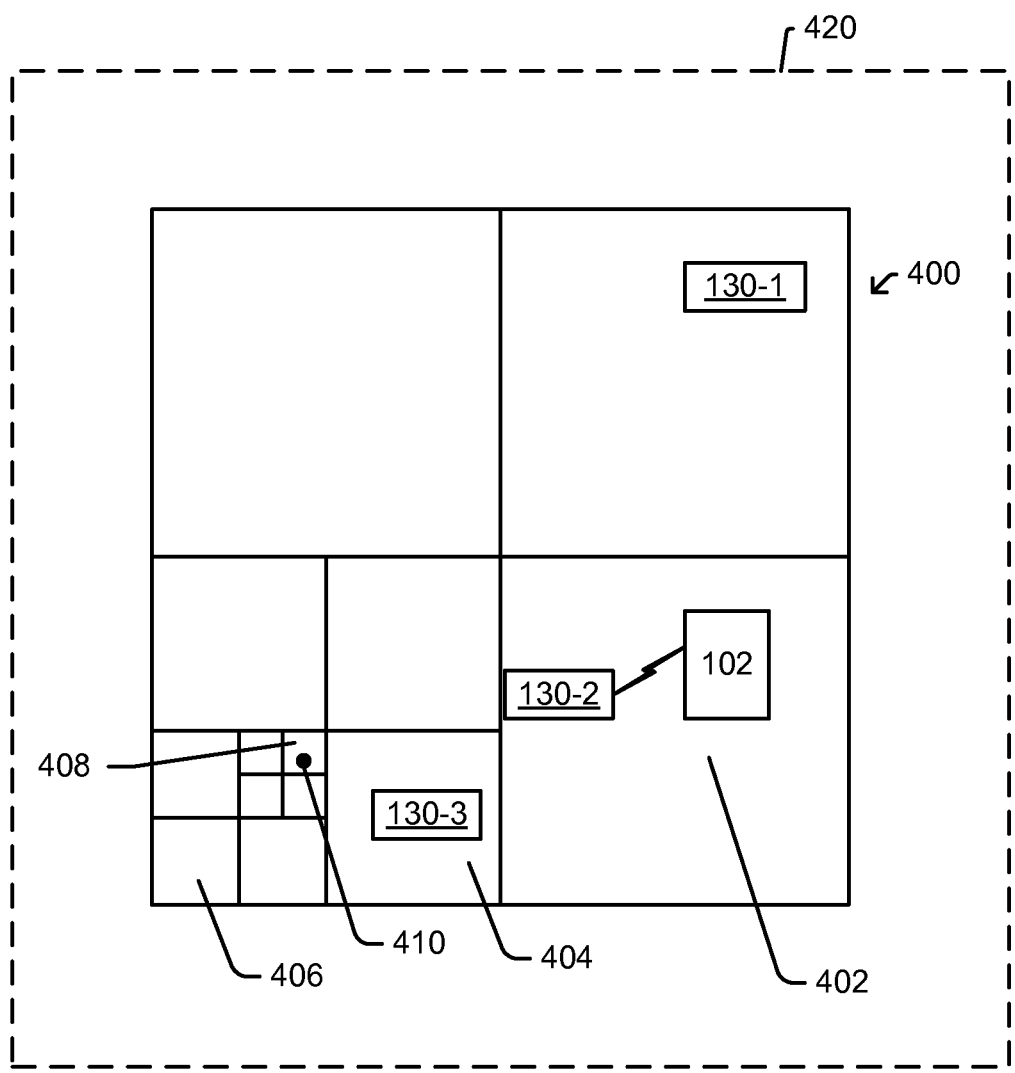
FIGS. 4-7 are block diagrams illustrating exemplary hierarchical zonal structures as may be implemented in or otherwise supported with a location based system as in FIG. 1, in accordance with certain implementations.

In FIG. 4, by way of non-limiting example, a hierarchical zonal structure 400 is shown as having zones (represented here by square blocks) arranged in a hierarchical (e.g., nested) fashion. For example, hierarchical zonal structure 400 comprises four large zones 402, each comprising four smaller zones 404 that comprise still smaller zones 406, which comprise even smaller zones 408. It should be kept in mind, however, that the shapes, numbers, sizes, proportions, etc., of the various zones are by way of illustration and example only and claimed subject matter is not intended to be so limited.

With this in mind, in FIG. 4, an item of interest 410 is illustrated at a specified location within zone 408, and mobile device 102 is illustrated within zone 402 as being in communication with nodal transmitting device 130-2. Here, nodal transmitting device 130-2 may be assumed to be operatively associated with at least a zonal position corresponding to at least an estimated position of mobile device 102. Also shown in FIG. 4 are other nodal transmitting devices 130-1 and 130-3, which are not currently operatively associated with the zonal position corresponding to mobile device 102 but which may have been or may be assuming mobile device 102 is moving.

FIG. 4 also depicts a region 420, which as previously mentioned, may represent a particular campus, compound, building(s), and/or the like. As such, while claimed subject matter is not necessarily limited, in certain instances one or more of the various zones may relate to certain identifiable features of such regions. For example, one of the four large zones 402 may represent a specific building of a campus (e.g., a library, a warehouse, etc.) or a specific store within a shopping mall, one of the smaller zones 404 may represent a specific floor of the building or department of the store, one of the still smaller zones 406 may represent an isle, and one of the even smaller zones 408 may represent a shelf on (or bin in) which item of interest 410 rests and/or is otherwise available or present in some manner.

In this example, as mobile device 102 is moved about, it may be served by different nodal transmitting devices 130 depending on position (e.g., estimated position and/or zonal position) and the information that may be provided in a response to a request may vary depending on position and/or servicing nodal transmitting device (see, e.g., block 310 of FIG. 3). For example, the information that may be provided in a response to a request may vary due to selective propagation of the information based, at least in part, on spatial and/or temporal restrictions (see, e.g., block 304 of FIG. 3). In certain example implementations, a nodal transmitting device may be operatively associated with all or part of one or more zones and/or zonal positions.

In certain example implementations, the context of information associated with item of interest 410 (e.g., a person, place, object, event, etc.) may characterize in some manner item of interest 410. For example, such information may relate to a spatial context, a social context, an information context, and/or the like. Thus, in the above example, assuming that the item of interest is a book that may be purchased or borrowed: a spatial context may relate to its specific location, a navigational route that may be followed to reach it, etc.; a social context may relate to its availability or current status; and, an information context may relate to its price, image, author, publisher, etc.

Figure 5:
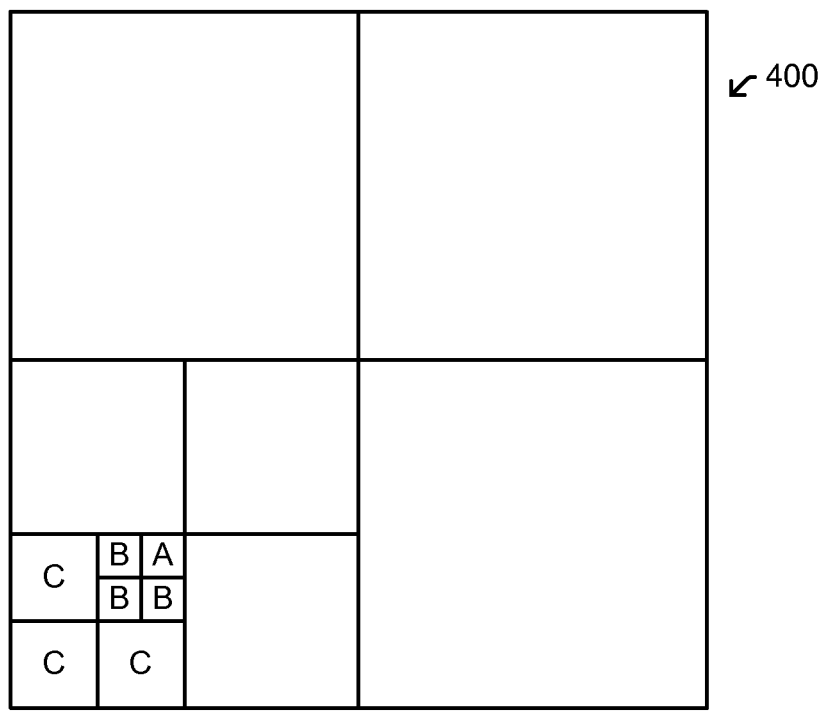

In FIG. 5, some of the zones of hierarchical zonal structure 400 are marked to indicate an example spatial restriction scheme that may be employed to provide selective propagation of information. Here, for example, one of the even smaller zones 408 is marked with an "A" to indicate an origin of the information and/or specific position of the item of interest and the remaining same size zones are marked with "B" to indicate a first level of information propagation. Also, in this example, a second level of information propagation is indicated for other zones (406 size) with "C". Thus, depending on a particular hierarchical structure, certain zones may be differentiated and information propagated thereto may be selectively controlled. For example, spatial and temporal restriction parameters may be employed as shown in FIGS. 6 and/or 7.

Figure 6:
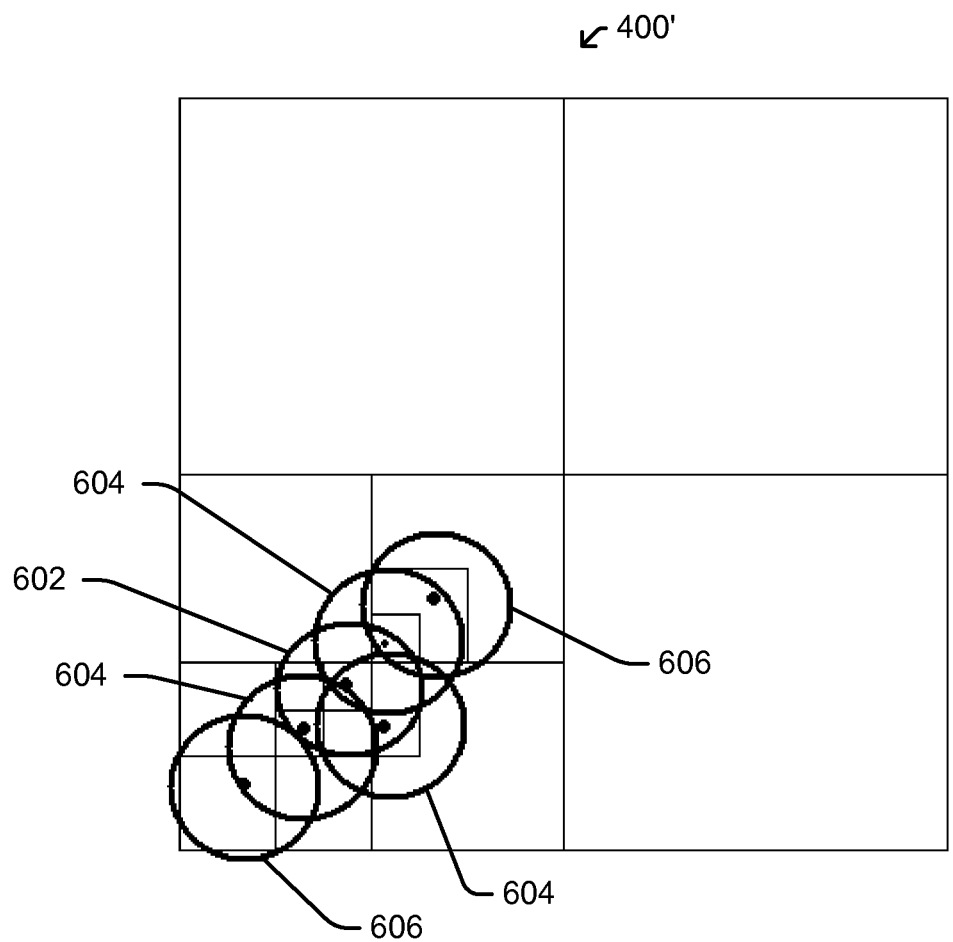
Figure 7:
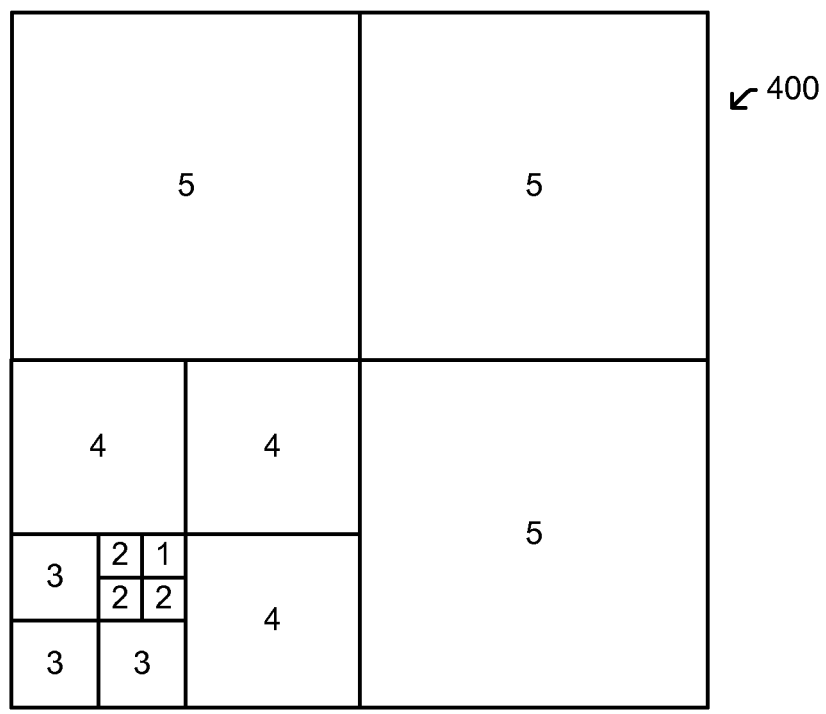

In FIG. 6, for example, a hierarchical zonal structure 400' is illustrated which is essentially formed "ad-hoc" rather than logically, e.g., due to transmission limitations of the nodal transmitting devices (shown in this example by coverage area circles). For example, in FIG. 6 a first propagation hop 602 is shown, along with second propagation hops 604, and then third propagation hops 606. Thus, a hierarchical zonal structure may be formed logically, ad-hoc, or a combination thereof, or in other like fashion.

Thus, in accordance with certain aspects, a location based system 120 may be implemented through various methods and apparatuses to selectively propagate information rather than allow for all or too much information to propagate in a less restricted manner. Such selective propagation techniques may be based, at least in part, on both spatial and temporal restriction parameters.

By way of further example, a spatial restriction parameter may include the use of a TTL value which may be included, and/or otherwise associated in some manner with, information that is broadcast by nodal transmitting devices and which indicates a controlled "propagation distance" for such broadcasted information. In this manner, for example, the scope of such broadcasted information may be restricted to a zone and/or close zones (e.g., hierarchically) from which it originated and/or where an item of interest is positioned.

Temporal restriction may, for example, use a refresh rate value that is associated with such broadcasted information indicating a controlled propagation distance. Here, for example, the further away (e.g., hierarchically) such information propagates from its source the less frequent the refresh rate may need to be. As such, such broadcasted information that may be most detailed and/or up to date may be broadcasted information that is available closer to the source and/or item of interest. Consequently, an amount of information that might otherwise be propagated in a location based system may be controlled and possibly reduced.

In certain example implementations, to restrict the information in a spatial context, a TTL value and/or the like may be employed in a manner such that a hop or additional location once traversed changes (e.g., reduces) the TTL value of the information until the value reaches a threshold (e.g., zero), at which point information propagation may be terminated. Such example techniques may take advantage of a hierarchical zonal structure to effectively limit information dissemination with regard to zonal position/distance. For example, a TTL value=2 may be used in FIG. 5 to limit propagation of information to logically formed zones marked "A", "B" and "C". For example a TTL value=2 may be used in FIG. 6 to limit propagation of information to ad-hoc zones labeled 602, 604 and 606.

In order to restrict information propagation in a temporal manner, a refresh rate value may, for example, be used to control how often or when information may be updated. For example, such temporal restriction may implement an inverse refresh/update rate based on (zonal) distances. For example, consider FIG. 7, in which refresh rate values are listed as integers 1-5 in the zones. Here, for example, outer zones with a refresh rate value of "5" may be updated less often than would the other zones with refresh rate values of "4", "3", "2", and "1". As such, in the example, zones with a refresh rate value of "4" may be updated less often than would the other zones with refresh rate values of "3", "2", and "1", and so on in like manner. Thus, in this example, the zone with a refresh rate value of "1" may be updated with information broadcasts the most often.

By way of further non-limiting example, the above refresh rate values may indicate a number of timed periods between updated broadcasts. Here, for example, a timed period of five seconds may be used such that zone "1" information is updated in a broadcast every 5 seconds, zone "2" information is updated in a broadcast every 10 seconds, zone "3" information is updated in a broadcast every 15 seconds, zone "4" information is updated in a broadcast every 20 seconds, and zone "5" information is updated in a broadcast every 25 seconds. Claimed subject matter is not necessarily limited such examples. Furthermore, other refresh rate values and/or schemes may be implemented, such as, e.g., based on functional, non-linear, dynamic, and/or other like considerations.

In certain example implementations, combined selectively propagation techniques may be employed which consider both spatial and temporal restriction parameters. For example, continuing with the example above in FIG. 7 using TTL values and refresh rate values the following example scheme may be provided: at time 0 seconds—broadcast information with TTL value =4 to propagate information to all zones; at time 5 seconds—broadcast information with TTL value =0 to propagate information to only zone "1"; at time 10 seconds—broadcast information with TTL value =1 to propagate information to zones "2"; at time 15 seconds—broadcast information with TTL value =0 to propagate information to only zone "1"; and, at time 20 seconds—broadcast information with TTL value =2 to propagate information to zones "3".

Thus, with this and/or other techniques provided by way of example herein, information dissemination may be controlled in a manner to allow entities to publish locale context information without overly burdening (e.g., without flooding or overwhelming) a location based system and/or LBS with information updates, etc. Hence, such techniques may, for example, allow for more efficient and/or cost effective location based system solutions by reducing data transmission, processing, and/or storage requirements.

In certain examples, information may be most fresh or current where it may be most needed or desired. For example, information about a queue at a printer may be updated (only) nearby the printer. This may also allow for more "real time" information from devices to be available, e.g., since it may be consumed locally rather than require global storage processing and/or otherwise incur additional (possible unnecessary) networking overhead.

An estimated position of a device may or may not be used in certain instances. For example, if a request for an item of interest is made using a broadcast (e.g., from a mobile device), only those nodal transmitters in the vicinity may actually receive such a request and possibly respond thereto.

Hence, in such example situation, responses will likely be limited to such local responses.

In certain example implementations, a request may also contain a TTL value and be rebroadcast, e.g., based on a scope of search which a mobile device desires. In certain example implementations, a request may be provided to a network based server and/or the like, which takes an estimated position of the device and identifies nodal transmitters which may respond. Here, for example, a network based server may forward a request(s) to one or more selected nodal transmitters, e.g., which may be located close or nearby the estimated position of the mobile device and/or which may otherwise be capable of satisfying the TTL value, etc. of the request.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature and/or example. Furthermore, the particular features, structures, or characteristics may be combined in one or more examples and/or features.

As used herein, a mobile device refers to a device such as a cellular or other wireless communication device (e.g., a cell phone), personal communication system (PCS) device, personal navigation device (PND), Personal Information Manager (PIM), Personal Digital Assistant (PDA), laptop, tablet, netbook, smartbook, or other suitable device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

For an implementation involving firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "generating", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in a location based system having a hierarchical zonal structure defined, at least in part, by a first nodal transmitting device located in a first zonal position in said hierarchical zonal structure and a second nodal transmitting device located at a second zonal position in said hierarchical zonal structure, said first zonal position being different than said second zonal position, the method comprising:

obtaining with said first nodal transmitting device one or more signals representing information associated with an item of interest located at a specified location, transmitting with said first nodal transmitting device to said second nodal transmitting device one or more signals representing part of said information associated with said item of interest, wherein within said location based system said first zonal position and said second zonal position are differentiated and propagation of said information and said part of said information is selectively controlled based, at least in part, on at least one of a spatial restriction parameter associated with said specified location, and a temporal restriction parameter associated with the hierarchical zonal structure.

2. The method as recited in claim 1, further comprising:
receiving with said first nodal transmitting device one or more signals representing a request from a mobile device for at least a portion of said information associated with said item of interest;
identifying at least an estimated position of said mobile device; and
selectively providing with said first nodal transmitting device one or more signals representing a response to said mobile device based, at least in part, on said estimated position of said mobile device, said response comprising at least a portion of said information.

3. The method as recited in claim 1, further comprising:
receiving with said first nodal transmitting device one or more signals representing a request from a mobile device for at least a portion of said information associated with said item of interest;
identifying at least an estimated position of said mobile device; and
selectively providing with said first nodal transmitting device said request to said second nodal transmitting.

4. The method as recited in claim 1, wherein the hierarchical zonal structure comprises a logically formed hierarchical zonal structure defined, at least in part, by a plurality of nodal transmitting devices.

5. The method as recited in claim 1, wherein the hierarchical zonal structure comprises an ad-hoc formed hierarchical zonal structure defined, at least in part, by a plurality of nodal transmitting devices.

6. The method as recited in claim 2, wherein identifying said estimated position of said mobile device comprises identifying a corresponding zonal position of said mobile device associated with the hierarchical zonal structure.

7. The method as recited in claim 1, wherein said spatial restriction parameter is associated with the hierarchical zonal structure.

8. The method as recited in claim 7, wherein said spatial restriction parameter comprises one or more signals representing a distance value to operatively restrict propagation of said information to one or more particular zonal positions of the hierarchical zonal structure.

9. The method as recited in claim 7, wherein said spatial restriction parameter comprises a time-to-live (TTL) value, and further comprising:
determining with said first nodal transmitting device whether said TTL value permits further propagation of said information and said part of said information within the location based system; and in response to determining that said TTL value does permit further propagation of said part of said information but not said information, transmitting with said first nodal transmitting device said one or more signals representing said part of said information to said second nodal transmitting device.

10. The method as recited in claim 1, wherein said temporal restriction parameter is associated with one or more signals representing a refresh rate value.

11. The method as recited in claim 10, wherein said first zonal position encompassing said specified location is associated with a first refresh rate value, and said second zonal position not encompassing said specified location is associated with a second refresh rate value that is different from said first refresh rate value.

12. An apparatus for use at a first nodal transmitting device within a location based system having a hierarchical zonal structure defined, at least in part, by a first nodal transmitting device located in a first zonal position in said hierarchical zonal structure and a second nodal transmitting device located at a second zonal position in said hierarchical zonal structure, said first nodal transmitting device located in a first zonal position in said hierarchical zonal structure and a second nodal transmitting device located at a second zonal position in said hierarchical zonal structure, said first zonal position being different than said second zonal position, wherein said first nodal transmitting device comprises:

a communication interface; and
at least one processing unit configured to obtain information associated with an item of interest located at a specified location and to transmit to said second nodal transmitting device a part of said information associated with said item of interest, and wherein within said location based system said first zonal position and said second zonal position are differentiated and propagation of said information and said part of said information is selectively controlled based, at least in part, on a spatial restriction parameter associated with said specified location, and a temporal restriction parameter associated with the hierarchical zonal structure.

13. The apparatus as recited in claim 12, said at least one processing unit further configured to:
obtain a request via said communication interface for at least a portion of said information associated with said item of interest from a mobile device;
identify at least an estimated position of said mobile device; and
selectively provide a response to said mobile device via said communication interface based, at least in part, on said estimated position of said mobile device, said response comprising at least a portion of said information.

14. The apparatus as recited in claim 12, said at least one processing unit further configured to:
obtain a request via said communication interface for at least a portion of said information associated with said item of interest from a mobile device;
identify at least an estimated position of said mobile device; and
selectively provide said request to said second nodal transmitting device.

15. The apparatus as recited in claim 12, wherein the hierarchical zonal structure comprises a logically formed hierarchical zonal structure defined, at least in part, by at least a plurality of nodal transmitting devices.

16. The apparatus as recited in claim 12, the hierarchical zonal structure comprises an ad-hoc formed hierarchical zonal structure defined, at least in part, by at least a plurality of nodal transmitting devices.

17. The apparatus as recited in claim 13, wherein identifying said estimated position of said mobile device comprises identifying a corresponding zonal position of said mobile device associated with the hierarchical zonal structure.

18. The apparatus as recited in claim 12, wherein said spatial restriction parameter is associated with the hierarchical zonal structure.

19. The apparatus as recited in claim 18, wherein said spatial restriction parameter comprises a distance value to operatively restrict propagation of said information to one or more particular zonal positions of the hierarchical zonal structure.

20. The apparatus as recited in claim 18, wherein said spatial restriction parameter comprises a time-to-live (TTL) value, and said at least one processing unit is further configured to:
   determine whether said TTL value permits further propagation of said information and said part of said information within the location based system; and
   in response to determining that said TTL value does permit further propagation of said part of said information but not said information, initiate transmission of said part of said information to said second nodal transmitting device via said communication interface.

21. The apparatus as recited in claim 12, wherein said temporal restriction parameter is associated with a refresh rate value.

22. The apparatus as recited in claim 21, wherein said first zonal position encompassing said specified location is associated with a first refresh rate value, and said second zonal position not encompassing said specified location is associated with a second refresh rate value that is different from said first refresh rate value.

23. An article comprising:
   a non-transitory computer readable medium having computer-implementable instructions stored thereon that are executable by one or more processing units, the instructions comprising :
      code to obtain at a first nodal transmitting device information associated with an item of interest located at a specified location within a coverage area of a location based system comprising said first nodal transmitting device and a second nodal transmitting device, said first nodal transmitting device and said second nodal transmitting device operatively forming a hierarchical zonal structure, said first nodal transmitting device located in a first zonal position in said hierarchical zonal structure and said second nodal located at a second zonal position in said hierarchical zonal structure, said first zonal position being different than said second zonal position;
      code to transmit with said first nodal transmitting device to said second nodal transmitting device a part of said information associated with said item of interest, wherein within said location based system said first zonal position and said second zonal position are differentiated and propagation of said information and said part of said information is selectively controlled based, at least in part, on a spatial restriction parameter associated with said specified location, and a temporal restriction parameter associated with the hierarchical zonal structure.

24. The article as recited in claim 23, wherein said computer-implementable instructions further comprise:
   code to obtain a request from a mobile device for at least a portion of said information associated with said item of interest;
   code to identify at least an estimated position of said mobile device; and
   code to selectively initiate transmission of a response to said mobile device based, at least in part, on said estimated position of said mobile device, said response comprising at least a portion of said information.

25. The article as recited in claim 23, wherein said computer-implementable instructions further comprise:
   code to obtain a request from a mobile device for at least a portion of said information relating to said item of interest;
   code to identify at least an estimated position of said mobile device; and
   code to selectively provide said request to said second nodal transmitting device.

26. The article as recited in claim 23, wherein the hierarchical zonal structure comprises a logically formed hierarchical zonal structure defined, at least in part, by at least a plurality of nodal transmitting devices.

27. The article as recited in claim 23, wherein the hierarchical zonal structure comprises an ad-hoc formed hierarchical zonal structure defined, at least in part, by at least a plurality of nodal transmitting devices.

28. The article as recited in claim 24, wherein said code to identify said at least an estimated position of said mobile device comprises code to identify a corresponding zonal position of said mobile device associated with the hierarchical zonal structure.

29. The article as recited in claim 23, wherein said spatial restriction parameter is associated with the hierarchical zonal structure.

30. The article as recited in claim 29, wherein said spatial restriction parameter comprises a distance value to operatively restrict propagation of said information to one or more particular zonal positions of the hierarchical zonal structure.

31. The article as recited in claim 29, wherein said spatial restriction parameter comprises a time-to-live (TTL) value, and wherein said computer-implementable instructions further comprise:
   code to determine whether said TTL value permits further propagation of said information and said part of said information within the location based system; and
   code to, in response to determining that said TTL value does permit further propagation of said part of said information but not said information, initiate transmission of said part of said information to said second nodal transmitting device.

32. The article as recited in claim 23, wherein said temporal restriction parameter is associated with a refresh rate value.

33. The article as recited in claim 32, wherein said first zonal position encompassing said specified location is associated with a first refresh rate value, and said second zonal position not encompassing said specified location is associated with a second refresh rate value that is different from said first refresh rate value.

34. An apparatus comprising:
   means for obtaining information associated with an item of interest at a specified location;
   means for transmitting a part of said information associated with said item of interest;
   means for communicating wireless signals; and means for storing information associated with said item of interest located at a specified location within a coverage area of a location based system comprising a plurality of means for communicating wireless signals operatively forming a hierarchical zonal structure and having different zonal positions within said hierarchical zonal structure, wherein within said location based system said first zonal position and said second zonal position are differentiated and propagation of said information and said part of said information is selectively controlled based, at least in part, on a spatial restriction parameter associated with said specified location, and a temporal restriction parameter associated with the hierarchical zonal structure.

35. The apparatus as recited in claim 34, further comprising:
   means for processing a request from a mobile device for at least a portion of said information associated with said item of interest;
   means for identifying at least an estimated position of said mobile device; and
   means for selectively providing a response to said mobile device based, at least in part, on said estimated position of said mobile device, said response comprising at least a portion of said information.

36. The apparatus as recited in claim 34, further comprising:
   means for processing a request from a mobile device for at least a portion of said information relating to said item of interest;
   means for identifying at least an estimated position of said mobile device; and
   means for selectively providing said request to one or more means for communicating wireless signals in said hierarchical zonal structure.

37. The apparatus as recited in claim 34, wherein the hierarchical zonal structure comprises a logically formed hierarchical zonal structure defined, at least in part, by at least a portion of said plurality of means for communicating wireless signals.

38. The apparatus as recited in claim 34, wherein the hierarchical zonal structure comprises an ad-hoc formed hierarchical zonal structure defined, at least in part, by at least a portion of said means for communicating wireless signals.

39. The apparatus as recited in claim 35, wherein said means for identifying comprises means for identifying a corresponding zonal position of said mobile device associated with the hierarchical zonal structure.

40. The apparatus as recited in claim 34, wherein said spatial restriction parameter is associated with the hierarchical zonal structure.

41. The apparatus as recited in claim 40, wherein said spatial restriction parameter comprises a distance value to operatively restrict propagation of said information to one or more particular zonal positions of the hierarchical zonal structure.

42. The apparatus as recited in claim 40, wherein said spatial restriction parameter comprises a time-to-live (TTL) value, and further comprising:
   means for determining whether said TTL value permits further propagation of said information and said part of said information within the location based system; and
   means for initiating transmission of at least a portion of said part of said information to at least one other of said plurality of means for communicating wireless signals, in response to determining that said TTL value does permit further propagation of said part of said information but not said information.

43. The apparatus as recited in claim 34, wherein said temporal restriction parameter is associated with a refresh rate value.

44. The apparatus as recited in claim 43, wherein a first zonal position encompassing said specified location is associated with a first refresh rate value, and a second zonal position not encompassing said specified location is associated with a second refresh rate value that is different from said first refresh rate value.

* * * * *